United States Patent [19]

Pytlewski et al.

[11] Patent Number: 4,471,143
[45] Date of Patent: Sep. 11, 1984

[54] COMPOSITION FOR DECOMPOSING HALOGENATED ORGANIC COMPOUNDS

[75] Inventors: Louis L. Pytlewski; Kenneth Krevitz, both of Philadelphia, Pa.; Arthur B. Smith, Newark, Del.

[73] Assignee: The Franklin Institute, Philadelphia, Pa.

[21] Appl. No.: 452,065

[22] Filed: Dec. 22, 1982

Related U.S. Application Data

[60] Continuation-in-part of Ser. No. 386,945, Jun. 10, 1982, and a continuation-in-part of Ser. No. 240,622, Mar. 5, 1981, which is a division of Ser. No. 158,359, Jun. 11, 1980, Pat. No. 4,337,368, which is a continuation-in-part of Ser. No. 142,856, Apr. 21, 1980, abandoned.

[51] Int. Cl.$^3$ ............... C07C 33/34; C07C 43/11
[52] U.S. Cl. ............... 568/715; 568/611; 568/618; 568/619; 568/678; 568/730
[58] Field of Search ............ 568/715, 730, 581, 602, 568/618, 619, 623, 678, 679, 606, 611

[56] References Cited

U.S. PATENT DOCUMENTS

| 1,996,744 | 4/1935 | Britton | 260/154 |
|---|---|---|---|
| 2,288,181 | 6/1942 | Burgdrof et al. | 568/679 |
| 2,391,011 | 12/1945 | Dickey et al. | 568/623 |
| 2,448,092 | 9/1944 | Gibson | 260/683.4 |
| 2,449,088 | 9/1948 | Smith | 260/396 |
| 2,714,609 | 8/1955 | Matter | 568/622 |
| 2,857,417 | 10/1958 | Matter et al. | 568/618 |
| 2,914,558 | 11/1959 | Cooper | 260/521 |
| 3,075,021 | 1/1963 | Luvisi et al. | 260/650 |
| 3,188,357 | 6/1965 | Blumbergs | 260/668 |
| 3,413,341 | 11/1968 | Bursack et al. | 568/730 |
| 3,413,464 | 3/1966 | Parvi | 260/620 |
| 3,595,931 | 7/1971 | Hay et al. | 260/668 |
| 3,686,337 | 8/1972 | Chang | 260/650 |
| 3,767,712 | 10/1973 | Daniels | 568/679 |
| 3,867,462 | 2/1975 | Keeney et al. | 568/581 |
| 4,001,340 | 1/1977 | Smith et al. | 260/620 |
| 4,327,027 | 4/1982 | Howard et al. | 568/730 |
| 4,337,363 | 6/1982 | Pytlewski et al. | 568/730 |
| 4,337,368 | 7/1982 | Pytlewski et al. | 568/730 |
| 4,400,552 | 8/1983 | Pytlewski | 568/715 |

FOREIGN PATENT DOCUMENTS

| 475496 | 7/1951 | Canada | 568/601 |
|---|---|---|---|
| 1930341 | 6/1969 | Fed. Rep. of Germany | 568/730 |
| 49-82570 | 8/1974 | Japan . | |
| 255880 | 7/1926 | United Kingdom | 568/774 |
| 618189 | 2/1949 | United Kingdom | 570/226 |
| 963267 | 7/1964 | United Kingdom | 568/601 |
| 1045298 | 10/1965 | United Kingdom | 568/796 |
| 1068832 | 5/1967 | United Kingdom | 568/774 |
| 1221019 | 2/1971 | United Kingdom | 568/796 |
| 2073188 | 10/1981 | United Kingdom | 568/678 |

OTHER PUBLICATIONS

Mulley, "J. Chemical Society", pp. 2065-2066, (1958).
W. H. Dennis et al., Bulletin of Environmental Contamination and Toxicology, vol. 14, No. 6, pp. 736-744, (1975).
A. Oku et al., Chemistry and Industry, pp. 841-842, (Nov. 1978).
P. Johncock et al., Analytical Chemistry, vol. 94, pp. 245-247, (1959).
Liggett, Analytical Chemistry, vol. 26, No. 4, pp. 748-750.
Furkawa et al., Makromol Chemistry, vol. 38, pp. 244-247, (1960).
Toke et al., Acta Chim. Acad. Sci. Hung., vol. 93(3-4), pp. 421-424.
Toke et al., Acta. Chim. Sci. Hung., vol. 100(1-4), pp. 257-264, (1979).
Pytlewski et al., Mid-Atlantic Industrial Waste Conference, Jul. 15-17, 1979.
Pytlewski et al., EPA-sponsored meeting in Chicago, Illinois, Mar. 17, 1980.

Primary Examiner—Werren B. Lone
Attorney, Agent, or Firm—Dann, Dorfman, Herrell and Skillman

[57] ABSTRACT

A composition of matter in the form of a coordination complex which is the product of the reaction of an alkali metal or alkali metal hydroxide of a polyglycol or a polyglycol monoalkyl ether and oxygen having utility as a decomposition reagent for halogenated organic compounds.

11 Claims, No Drawings

COMPOSITION FOR DECOMPOSING HALOGENATED ORGANIC COMPOUNDS

This application is a continuation-in-part of our pending U.S. patent application Ser. No. 240,622, filed Mar. 5, 1981, and a continuation-in-part of our pending U.S. patent application Ser. No. 386,945, filed June 10, 1982, which is a divisional of our U.S. patent application Ser. No. 158,359, filed June 11, 1980, now U.S. Pat. No. 4,337,368, which latter application was a continuation-in-part of our U.S. patent application Ser. No. 142,865, filed Apr. 21, 1980, and now abandoned.

BACKGROUND OF THE INVENTION

The present invention relates to a composition of matter having utility as a reagent for decomposing hazardous halogen-containing organic compounds, such as polychlorinated biphenyls (PCBs).

The potential hazard to health and the environment posed by the indiscriminate disposal of a variety of synthetic halogen-containing organic chemicals is well known. Compounds such as polychlorinated biphenyls, dichlorodiphenyltrichloroethane (DDT), decachlorooctahydro-1,3,4-metheno-2H-cyclobuta [c,d]-pentalen-2-one (Kepone®), and 2,4,5-trichlorophenoxyacetic acid, (2,4,5-T), although having demonstrated utility, have been found in recent years to be persistent environmental poisons, and, therefore, require a safe and effective means of disposal.

Halogenated organic compounds pose a difficult disposal problem because of the highly stable nature of the carbon-halogen bonds present therein. The bond energy of a carbon-chlorine bond, for example, is on the order of eighty-four kcal./mole. These compounds are not only resistant to biodegradation, they cannot be degraded in a practical and effective manner by any of the conventional chemical decomposition methods. In most cases, methods, such as chlorolysis, catalyic dehydrohalogenation, molten salt reactions, ozone reactions, and alkali metal reduction, do not achieve complete dehalogenation. Moreover, these prior art methods typically require expensive reagents, inert atmospheres, extensive temperature control, complex apparatus, substantial energy consumption, and the like.

PCBs present a particularly serious disposal problem. Once widely used as dielectric fluids in electrical equipment, such as transformers and capacitors, because of their excellent insulating properties, the use of PCBs was banned recently by the United States Environmental Protection Agency (E.P.A.) due to cumulative storage in human fatty tissue and reports of extremely high toxicity. In connection with the ban, the E.P.A. has promulgated rules under which the only available means for complete decomposition of extant PCBs and PCB-contaminated substances is incineration. However, incineration of PCB-contaminated materials in accordance with E.P.A.-approved procedures is decidedly wasteful since potentially recyclable materials, such as dielectric and hydraulic fluids, which may contain a relatively small amount of PCBs are destroyed in the process. To avoid such waste, it has been proposed to treat recyclable materials contaminated by PCBs with an absorbent, e.g., by passing the material through a bed of activated charcoal or a resin to selectively remove the PCBs from said material. Although PCBs are physically removed from the recyclable material in this manner, the disposal of absorbed PCBs still remains a problem.

Several chemical methods for decomposition of PCBs have been proposed employing high surface sodium, sodium/naphthalene, and sodium naphthalide. These methods have some notable limitations, however, in that the reagents are difficult to prepare, expensive to ship and unstable in storage. Moreover, the sodium-containing decomposition reagents proposed heretofore are sensitive to oxygen and to water and therefore cannot be used reliably under field conditions.

Aside from the PCB disposal problem, there are significant quantities of other waste or excess halogen-containing organic chemicals presently being stored by manufacturers, processors or consumers, which chemicals must be disposed of eventually in an environmentally acceptable manner. It is estimated that the amount of hazardous chemical substances generated by industry increases by about three percent annually. Viewed realistically, storage of toxic chemicals can only be considered a stop-gap measure while efforts to develop a safe, practical and effective process for their disposal continue.

SUMMARY OF THE INVENTION

In accordance with the present invention, there is provided a composition capable of effecting substantially complete dehalogenation of a wide variety of halogenated organic compounds, including PCBs.

The composition of the present invention is a coordination complex in liquid form, which is the product of the reaction of an alkali metal or alkali metal hydroxide, a compound having the general formula

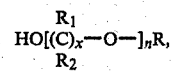

wherein R is hydrogen or lower alkyl, $R_1$ and $R_2$ are the same or different and are selected from the group consisting of hydrogen, unsubstituted or substituted lower alkyl, unsubstituted or substituted cycloalkyl having from 5 to 8 carbon atoms, and unsubstituted or substituted aryl, n has a value of from 2 to about 400, and x has a value of at least 2, and oxygen. The complex contains no less than 2.0% by weight of alkali metal ion, and at least one superoxide radical anion, the latter being evidenced by the occurrence of a spectral absorption when the complex is subjected to electron spin resonance spectroscopy. The complex also includes at least one basic nucleophilic anion and is characterized by showing no maxima of OH stretch absorption bands above about 3000 cm$^{-1}$, when subjected to infra-red spectroscopy.

The composition of the present invention provides an economical way of decomposing halogenated organic compounds, as it is made from relatively inexpensive starting materials and no specialized equipment is required in connection with its preparation or use. The composition is extremely effective, undergoing reaction with a host of halogenated organic compounds and producing complete and rapid cleavage of the carbon-chlorine bond under moderate reaction conditions.

DESCRIPTION OF THE INVENTION

Any of the alkali metals or hydroxides thereof may be used to provide the alkali metal ion component of the composition of the present invention. Sodium and potassium, and their hydroxides are preferred because of their ready availability and relatively low cost. As indicated above, the alkali metal ion comprises no less than 2.0% of the total weight of the complex. Complexes containing less than 2.0% of alkali metal ion by weight tend to be ineffective dehalogenating reagents.

A second component of the composition is a residue of a compound having the general formula

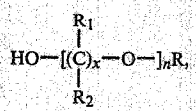

wherein R is hydrogen or lower-alkyl, $R_1$ and $R_2$ are the same or different and are selected from the group consisting of hydrogen, unsubstituted or substituted lower alkyl, unsubstituted or substituted cycloalkyl having from 5 to 8 carbon atoms, and unsubstituted or substituted aryl, n has a value from about 2 to about 400, and x has a value of at least 2, which includes polyglycols and polyglycol monoalkyl ethers. The term "residue", used herein in regard to the polyglycols and polyglycol monoalkyl ethers of the above formula, refers to that portion of the compound present in the complex after the complex forming reaction is completed.

Representative lower alkyl radicals in the foregoing formula are methyl, ethyl, propyl, isopropyl butyl, and isobutyl. Representative cycloalkyl radicals are cyclopentyl, cyclohexyl, cycloheptyl or cyclooctyl. Representative aryl radicals are phenyl, benzyl, biphenyl, or naphthyl, i.e. aromatic groups having a total of 6 to 12 carbon atoms. The substituents on the $R_1$ and $R_2$ radicals include, but are not limited to, lower-alkyl, e.g., methyl, ethyl, propyl, isopropyl butyl, or isobutyl; halo, e.g., chloro, bromo; nitro; sulfato; carboxyl; amino; mono-and di-lower-alkylamino, e.g., methylamino, ethylamino, dimethylamino, methylethylamino; amido; hydroxy, lower alkoxy, e.g., methoxy or ethoxy.

Suitable compounds falling within the above general formula include diethylene glycol, diethylene glycol monomethyl ether, polyether glycols, such as polyethylene glycols, polypropylene glycols, and polybutylene glycols and related long chain glycol monoalkyl ethers. The preferred compounds of the above general formula are those wherein $R_1$ and $R_2$ are hydrogen and x is 2. Particularly preferred are polymers of polyethylene glycol having the formula $HO[CH_2\text{-}CH_2\text{-}O]_nH$ wherein n may have a value between about 2 and about 400. These polymers have an average molecular weight range from about 100 to about 20,000. Neither low volatility, non-polar liquids, nor glycolic liquids in which both terminal hydoxyl groups are alkylated have been found to produce the desired decomposition complex.

The term "polyglycols", as used herein is intended to signify polymers of dihydric alcohols.

Oxygen is a third component required for forming the composition of the present invention. When an alkali metal or alkali metal hydroxide and a compound of the above general formula are reacted in the presence of oxygen, the formation of the complex is readily observable, as the reaction mixture, which is initially clear, takes on a dark amber color. This color change does not occur in the absence of oxygen. For example, the reaction of sodium or sodium hydroxide with polyethylene glycol in a nitrogen atmosphere produces a solution which is virtually clear and which produces only partial dehalogenation of halogenated organic compounds. However, when oxygen is thereafter introduced into the system, the aforementioned color change occurs and substantially complete dehalogenation is obtained.

The reaction for producing the complex proceeds spontaneously at room temperature simply by mixing the reactants in an open reaction vessel, preferably with stirring. It is unnecessary to bubble oxygen into the reaction mixture, for atmospheric oxygen satisfies the requirements of the reaction. No temperature control or specialized equipment is required for carrying out the reaction. If desired, the reaction mixture may be heated to about 80° C. to 100° C. to accelerate the rate of reaction. The reaction employing alkali metal hydroxides is considerably less exothermic than the analogous reaction in which elemental alkali metal is employed as a starting material.

Theoretically, the stoichiometry of the reaction requires one mole of alkali metal or alkali metal hydroxide per mole of polyglycol or polyglycol monoalkyl ether. In practice, however, it has been found that satisfactory results are obtained using a slight molar excess of the alkali metal or alkali metal hydroxide, i.e., on the order of 1 to 2 moles of alkali metal or alkali metal hydroxide per mole of polyglycol or polyglycol monoalkyl ether. Particularly good results are obtained when the mole ratio of these two reactants is 1.1 to 1. It appears that at this particular mole ratio, optimum solubility of the alkali metal or alkali metal hydroxide in the polyglycol or polyglycol monoalkyl ether is achieved.

Formation of the complex does not require a solvent. Nor is a solvent needed for miscibility or reactivity of the complex with halogenated compounds. Complexes formed in accordance with the present invention are useful without a solvent because they are liquids at normal reaction temperature, e.g., 20° C. to 125° C. Alkali metal hydroxides and alkoxides which have been proposed heretofore for various reactions with relatively non-polar organic substances, on the other hand, require dissolution in polar, usually protic solvents, such as alcohols. By comparison to such solutions, the complexes of the present invention may be prepared substantially unsolvated and used as such. In other words, any complex of the present invention may be formed as a homogenous material, useful as is, in effect, providing its own solvent.

If desired, however, the complexes of the present invention may be prepared using a solvent. For example, when an alkali metal hydroxide is employed in forming the complex, it may be in the form of a solid or an aqueous solution. In the latter case, the concentration of the solution may be as high as about 75 weight percent. The use of an aqueous solution of the alkali metal hydroxide produces an aqueous solution of the complex which, as explained hereinbelow, facilitates the separation and removal of halogen-containing organic compounds from water-immiscible liquids, e.g., functional fluids, contaminated therewith. There is a limit, however, to the amount of water that may be added to the complex in this manner. For example, when a 50 weight percent solution of sodium hydroxide is reacted with an approximately equimolar amount of polyethylene glycol (average M.W. of 400), the reaction mixture separates into an upper phase comprising the complex mixed with about 20 weight percent water and a lower aqueous phase containing unreacted sodium hydroxide. The complex may be readily decanted from the aqueous phase.

Although the addition of water to the complex has the advantage of facilitating the process of decontaminating water-immiscible liquids contaminated with halogenated organic compounds, the resulting solvation of the complex has the tendency to reduce its reactivity. For example, while there is no change in reactivity of the complex when the water content is below 5% by weight, a slight but noticeable decrease in reactivity occurs when the amount of water mixed with the complex exceeds this level. There is a gradual continuing reduction in reactivity as the amount of water mixed with the complex is increased to about 20% by weight. It is believed that if the water content of the complex were increased much beyond about 20% by weight, it would not be suitable for use on a commercial basis. The effect of solvation on the complex is more pronounced in treating functional fluids containing halogenated organic compounds, than in treating relatively concentrated halogenated organic compounds, e.g., neat PCBs. This is believed to be due to a reduction in miscibility of the halogenated organic compound in the complex at a water content exceeding 5% by weight. Moreover, the effect of solvation on the complex seems to be greater when the complex is prepared using an alkali metal, than when it is prepared using an alkali metal hydroxide. It has also been found that the reduction in complex reactivity due to solvation is greater for polar protic solvents, than for polar aprotic solvents.

Complexes formed from an alkali metal or alkali metal hydroxide, a polyglycol or polyglycol monoalkyl ether of the above formula and oxygen, in the manner described above are believed to be of the crown ether variety, with the residue of the polyglycol or polyglycol monoalkyl ether compound encircling the alkali metal ion.

These complexes contain at least one basic, neucleophilic anion and at least one superoxide radical. The nucleophilic anion is believed to be an alkoxide ($RO^-$) or a hydroxide ($ROH.OH^-$), where R signifies a polyglycol or polyglycol monoalkyl ether residue. These are ideal moieties for complexation with metal cations. The presence of nucleophilic anion in the complex may be determined by infra-red analysis. Infra-red spectra of the complexes described hereinabove exhibit no maxima of OH stretch absorption bands above 3000 $cm^{-1}$, as normally appears in the spectra of primary alcohols, such as polyglycols. Rather, the OH stretch adsorption bands of the complexes appear at much lower wave numbers, which is indicative of very strong hydrogen bonding in the complex. This shift is believed to be attributable to the presence of the basic nucleophilic anion in the complex. As a result of this shift, the intensity of the OH stretch absorption band is appreciably decreased to the point that it appears as a shoulder of the CH stretch absorption band, which generally occurs at about 2900 $cm^{-1}$. In this respect the complexes of the present invention are distinguishable from simple alkali metal alcoholates.

The presence of the superoxide radical in the complex is determined by the occurence of a strong electron spin resonance (E.S.R.) absorption band located at approximately 3,300 gauss, having a narrow band width of about 7 gauss. This E.S.R. spectrum matches that observed for the superoxide ion, $O_2^-$.

Once formed, the complex may be used immediately, or it may be stored for later use. In general, the complex may be stored for at least six months without appreciably diminishing its reactivity.

In order to achieve substantially complete decomposition of a halogenated organic compound using the complex of this invention, all that is necessary is to add the halogenated compound to complex in the presence of oxygen. Attempts to dechlorinate PCBs in an inert atmosphere, such as dry nitrogen, using a complex formed from sodium, polyethylene glycol and oxygen have produced partial dehalogenation of the PCBs. The partially dehalogenated reaction product may be substantially completely dehalogenated by introducing oxygen into the reaction mixture.

The two stage procedure just described is especially effective for decontaminating water-immiscible functional fluids contaminated with halogenated organic compounds and is the subject of U.S. patent application Ser. No. 429,096, filed Sept. 30, 1982, which is commonly assigned herewith.

While decomposition will occur at ambient temperature, the mixture may be heated to speed the rate of reaction. Heating to a temperature in the range of about 40° C. to about 180° C. has been found to produce satisfactory results. Of course, the temperature may vary depending upon the nature of the decomposition reagent used and the halogenated organic compound being decomposed.

The mole ratio of the complex to the halogen in the organic substance to be decomposed should be 1 to 1, or greater, in order to ensure substantially complete dehalogenation.

Representative halogenated organic compounds which may be decomposed in accordance with the present invention include hexachlorocyclohexane, hexachlorobenzene, trichlorobenzene, tetrachlorobenzene, dichlorophenol, pentachlorophenol, dichlorodiphenyltrichloroethane, decachlorooctahydro -1,3,4-metheno-2H-cyclobuta-[c,d]-pentalen-2-one, tetrachlorodibenzo-p-dioxin (TCDD), and polychlorinated biphenyls. As mentioned above, this invention is particularly useful for the decomposition of the polychlorinated biphenyls (PCBs). Brominated or fluorinated analogues of any of the aforementioned compounds may also be decomposed using the complex of the present invention.

The complex of the present invention is useful not only for the decomposition of concentrated halogenated organic compounds, e.g., "neat" PCBs, but also provides a very effective and efficient way for decomposing and disposing of halogenated organic compounds that are dissolved in otherwise useful water-immiscible liquids, as exemplified below. Thus, the present invention enables reclamation of dielectric fluids or other functional fluids containing halogenated organic compounds, such as transformer oils contaminated with PCBs.

As previously noted, halogenated organic compounds are readliy removed from water-immiscible liquids containing them by treatment with a complex of the present invention which may contain up to about 20% weight of water. In carrying out this treatment, the water-containing complex is simply added to the water-immiscible liquid containing the dissolved halogenated organic compound in the presence of oxygen to effect decomposition, and after the decomposition reaction is complete, the substances remaining separate into two liquid phases. One is an organic phase comprising the water-immiscible liquid substantially free of the halogenated organic compound. The other is an inorganic phase containing the products from the decomposition of the halogenated organic compound. The two phases are readily separated one from the other, for example, by decantation, and the water-immiscible liquid is available for reuse. This procedure may be used to advantage for the reclamation of dielectric fluids or other functional fluids which are contaminated with PCBs. It is particularly effective as a means of reclassifying PCB Transformers or PCB-Contaminated Transformers to Non-PCB Transformers, i.e. transformers containing PCBs at a concentration of less than 50 ppm, as provided in the U.S. Environmental Protection Agency's final PCB ban rule, which became effective July 2, 1979.

The order in which the steps of the decomposition method are carried out is not considered critical. While a presently preferred procedure has been described hereinabove, the method may be practiced otherwise. For example, the halogen-containing organic compound may be added to the polyglycol or polyglycol monoalkyl ether prior to the addition of the alkali metal or alkali metal hydroxide, or the latter may be added together with the halogenated organic compound to the polyglycol or polyglycol monoalkyl ether. If desired, the alkali metal or alkali metal hydioxide may be mixed with the halogenated organic compound, and the polyglycol or polyglycol monoalkyl ether added later to the resultant mixture. As another alternative, the alkali metal or alkali metal hydroxide and halogen-containing organic compound may be added to the polyglycol or polyglycol monoalkyl ether in an oxygen-free atmosphere, e.g., pure nitrogen, with subsequent introduction of oxygen into the reaction mixture to effect rapid and substantially complete halogenation of the halogenated compound.

Standard safety precautions used in the handling of alkali metals and alkali metal hydroxide should be followed in preparing and using the complex.

Decomposition of halogenated organic compounds using the method of the present invention produces relatively innocuous products, the principal ones being sodium chloride, and various oxygenated derivatives of the starting halogenated organic compounds. These products are readily disposable under environmentally safe conditions. Alternatively the oxygenated derivatives may be converted to polyhydroxylated compounds useful as reactants in the production of polymers, as plasticizers, as anti-oxidants, and as solvents for high temperature reactions. These products are readily recoverable from the reaction medium by conventional separation techniques.

The following examples further describe the manner and process of making and using the present invention and set forth the best mode contemplated for carrying out the invention, but are not to be construed as limiting the invention.

EXAMPLE I - PREPARATION OF COMPLEX AND DECHLORINATION OF A PCB OIL (AROCHLOR 1254)

A complex was formed from sodium (Na), polyethylene glycol and oxygen by placing 900 ml of polyethylene glycol, having an average M.W. of 400 (referred to in these examples as PEG 400) in a 3000 ml beaker and heating until the temperature approached 80° C. Stirring was accomplished by using an efficient overhead mechanical stirrer (a magnetic stirring assembly would also be suitable). Thereafter, approximately 55 grams of freshly cut sodium metal was added, all within a two minute period. CAUTION: If the sodium metal is added over an extended period of time the possibility of a sodium fire may exist. Within ten minutes, the temperature of the mixture rose to about 120° C. and was maintained as close as possible to this value, until all the sodium, which melted and formed a shiny layer on top of the PEG 400, had reacted. Reaction is evidenced by the change of color of the PEG 400 to a dark amber and the disappearance of the shiny metal layer. If all of the sodium does not react, small additions of PEG 400 may be used to effect complete reaction. Alternatively, the NaPEG mixture may be placed in a separatory funnel and the lower NaPEG layer drawn off. The unreacted sodium metal will rise to the top and may be decomposed by reaction with methanol.

EXAMPLE II - PREPARATION OF COMPLEX REAGENT USING AQUEOUS NaOH SOLUTION

A complex was formed from sodium hydroxide, polyethylene glycol and oxygen by mixing in a beaker open to the atmosphere 10 ml of a 50 weight percent aqueous sodium hydroxide solution and 40 ml of PEG 400. The mixture was heated to 95° C. with stirring for 15 minutes. Stirring was discontinued and after a short period two distinct phases formed. The upper phase appeared dark brown and was similar in appearance to the reagent prepared according to the procedure set forth in Example I, above. The lower phase appeared clear, and its volume was about 10 ml.

EXAMPLE III - PREPARATION OF COMPLEX USING SOLID NaOH

A complex consisting of the same components as in Examples I and II above was formed by mixing 10 grams of solid NaOH with 50 ml of PEG 400 in an open beaker and heating the mixture at 120° C. for about 2 hours. The appearance of the dark brown color indicated that the complex had been formed.

EXAMPLE IV - DECHLORINATION OF A PCB OIL

Dechlorination of a PCB-oil was carried out by heating 25 g of the complex prepared as described in Example I to 100° C. and adding thereto exactly 10.00 ml of a 1000 ppm Inerteen ® in cyclohexane standard. Inerteen ® is a commercial polychlorinated biphenyl (PCB) oil manufactured by Westinghouse, Inc. At this temperature the cyclohexane boiled off immediately, leaving the PCB in intimate contact with the complex. After 10 minutes reaction time, a 4 ml aliquot was withdrawn from the reaction mixture and then added to 5 ml of distilled water and stirred vigorously for three minutes. After complete solution of the aliquot in water, 5 ml of reagent grade cyclohexane was added to the aqueous system and stirred again for three minutes.

After the two phases separated, the organic layer was analyzed for its Inerteen concentration via gas chromatography with an electron capture detector, preceded by a Florosil column clean-up step. The experimental conditions for the gas chromatographic analysis were as follows: Injection port temperature, 200° C.; Detector temperature, 200° C.; Column temperature, 200° C.; Isothermal scan; Scan time, 20 minutes; Carrier gas, 10% methane in argon; Carrier gas flow rate, 40 ml/minute; Column packing, 1.5% OV-17 and 1.95% QF-1 on 80/100 mesh GasChrom Q.

Gas chromatographic analyses showed the concentration of Inerteen remaining after the ten minute reaction time to be less than 50 parts per billion (ppb).

In all dehalogenation reactions using the complex of this invention, a common reaction product is a sodium halide, which in the case of dechlorination is specifically sodium chloride. Hence, the degree of decomposition can be determined by measuring the halide ion content of the decomposition reaction mixture. In the decomposition reaction just described, for example, a 5 ml aliquot of the aqueous phase formed upon addition of cyclohexane to the reaction mixture was added to 50 ml of water and tested for water soluble $Cl^-$ using a $Cl^-$ selective electrode. The analysis showed that the PCB had been dehalogenated to the extent of 97% ±3%.

The $Cl^-$ selectivity was tested for possible interferences using aliquots of fresh complex in water. The $Cl^-$ selective electrode was unresponsive and therefore it was concluded that the complex did not cause interference. The rate of appearance of water soluble $Cl^-$ may be used to do precise kinetic measurements on this system. A confirmatory test for the formation of water soluble $Cl^-$ in dechlorination reactions using the complex of the present invention was conducted whereby aliquots of the reaction mixtures were acidified with 0.3 M $HNO_3$, aqeous $AgNO_3$ added, and AgCl precipitated. The AgCl residues were analyzed using SEM techniques and found to be pure.

EXAMPLE V - DECHLORINATION OF PCB'S IN HYDROCARBON-BASED TRANSFORMER OILS

One quart of hydrocarbon-based transformer oil, contaminated with approximately 1000 ppm of PCB's, was heated to 100° C. in a two liter beaker. Thereafter, 25 grams of the complex prepared as described in Example I were added to the oil sample and stirred vigorously, using an overhead mechanical stirrer (a magnetic stirring assembly would also be suitable).

After 1 hour reaction time, the reaction mixture was allowed to cool to room temperature and then was added to a 4000 ml separatory funnel having a glass stopcock (Teflon would also be suitable). To help ensure complete transfer of the oil sample, small (25 ml or less) portions of a 1 N NaOH solution may be used to rinse the beaker. To extract products of the dechlorination reaction, 1 liter of 1 N NaOH was added to the separatory funnel which was then stoppered and shaken vigorously for five minutes, venting excess pressure buildup as necessary. The aqueous layer was drawn off and discarded and the extraction procedure with NaOH was repeated with a fresh 1 liter sample of aqueous base. Extractions were repeated until the aqueous layer showed no visible dark coloration after extraction. This will generally require 3-5 extractions with fresh NaOH solution.

After disposal of all aqueous extracts, the transformer oil was dried and clarified by passing through a column of 5 Angstrom molecular sieves. The molecular sieves were packed in a glass tube fitted with a stopcock or other means of regulating eluant flow rate. The dimensions of the glass column were approximately 1 inch inside diameter by 19 inches in length. The column was prepared by placing a small wad of glass wool in the bottom of the tube and then placing a 14 inch bed of molecular sieves atop the glass wool. The oil sample was dried by simply pouring it through the column and collecting the eluant in a clean, dry flask. The rate of elution should not exceed 2 drops per second, or the sample will not be effectively dried. In addition, the first 50-75 ml of eluant will have to be re-added to the system to complete the drying procedure, because the initial amount of oil added to the column will pass through very quickly and will not be efficiently contacted by the molecular sieves.

The concentration of PCBs remaining in the dried transformer oil was determined by removing a 10 ml sample of oil, adding it to an equal volume of pure PEG 400, and stirring vigorously for three minutes. The PCBs were extracted into the PEG 400 layer and were further extracted by removing the PEG 400 layer and adding it to 10 ml of reagent grade cyclohexane. After stirring vigorously for five minutes, the two layers were allowed to separate and the cyclohexane layer was analyzed by gas chromatography as described in Example I. The results showed residual PCB to be present in a concentration of less than 50 ppb.

This example shows that the composition of this invention may be used effectively to scavenge PCBs from recyclable materials contaminated therewith.

EXAMPLE VI - DECHLORINATION OF PURE HEXACHLOROBENZENE

Hexachlorobenzene was dechlorinated in a procedure essentially identical to that described in Example IV using a complex prepared as described in Example I. The only exceptions were that hexachlorobenzene was added neat and that the weight ratio was four grams of the complex per gram of hexachlorobenzene dechlorinated. Gas chromatographic analyses showed the hexachlorobenzene to be essentially completely dechlorinated, with a residual concentration of 50 ppb or less.

EXAMPLE VII - DECHLORINATION OF KEPONE

Kepone ® was dechlorinated following the procedure of Example IV using a complex prepared as described in Example I. Kepone ® was dissolved in a 15% (by vol.) acetone-cyclohexane mixture to the extent of 1000 ppm. 10 ml of this solution was added to the complex prepared as described in Example 1. Gas chromatographic analyses showed the Kepone to be substantially completely dechlorinated.

EXAMPLE VIII - DECHLORINATION OF PCBs

A 15 ml sample of the complex prepared in Example II was added to 1 gram of Inerteen ® (neat) and heated to 145° C. with stirring. Samples of the reaction mixture were taken at one-half hour intervals, extracted with cyclohexane and analyzed by Hewlett Packard No. 5700 gas chromatograph with an electron capture detector (GC/EC) operated under the following conditions: Column packing: Supelco Inc. 1.5% SP-2250/1.95% SP-2401 on 100/200 mesh Supelcoport; Injector and detector temperature: 250° C.; Column temperature: 200° C.; Carrier gas: argon containing 10 weight percent methane; Flow rate: 40 ml./min. After one hour, GC/EC indicated that complete dechlorination of the Inerteen ® had been effected.

In another test, a 2 gram sample of Inerteen ® was added to the beaker containing the complex prepared in Example III, and the temperature of the mixture was maintained at about 120° C. Analysis of the decomposition reaction mixture by GC/EC (operated under the same conditions described above) indicated that after one hour the chlorine content of the PCBs had been reduced by about approximately 85 to 90%.

The procedures described in the preceding examples may be used with success for the decomposition of a wide variety of other halogen-containing organic compounds. Mixtures of organic halogenated compounds other than PCBs may also be decomposed by this method.

While particular embodiments of the present invention have been described and exemplified hereinabove, it is not intended to limit the invention to such embodiments, but changes and/or additions may be made therein and thereto without departing from the spirit and scope of the invention as set forth in the following claims.

What is claimed is:

1. A homogeneous composition of matter in liquid form comprising a coordination complex which is the product of the reaction of an alkali metal or alkali metal hydroxide, a compound having the general formula

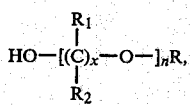

wherein R is hydrogen or lower alkyl, $R_1$ and $R_2$ are the same or different and are selected from the group consisting of hydrogen, unsubstituted or substituted lower alkyl, unsubstituted or substituted cycloalkyl having from 5 to 8 carbon atoms, and unsubstituted or substituted aryl, n has a value of from 2 to about 400, and x has a value of at least 2, and oxygen, the mole ratio of alkali metal or alkali metal hydroxide to said compound being from about 1 to 2 moles of alkali metal or alkali metal hydroxide per mole of said compound, said complex containing no less than 2.0% by weight of alkali metal ion, at least one superoxide radial anion, as indicated by the occurrence of a spectral absorption when said complex is subjected to electron spin resonance spectroscopy, and at least one basic nucleophilic anion, and showing no maxima of OH stretch absorption bands above about 3000 $cm^{-1}$ when subjected to infra-red spectroscopy.

2. The composition claimed in claim 1 wherein the alkali metal ion is selected from the group consisting of sodium, lithium and potassium ions, and the compound of said formula is one in which $R_1$ and $R_2$ are hydrogen and x is 2.

3. The composition claimed in claim 2 wherein the alkali metal ion is a sodium ion and the compound of said formula is a polyethylene glycol.

4. The composition claimed in claim 2 wherein the alkali metal ion is a sodium ion and the compound of said formula is diethylene glycol monomethylether.

5. The composition claimed in claim 2 wherein the concentration of said superoxide radical anion comprises between 0.01 and 1.0% of the total weight of said complex.

6. The composition claimed in claim 2 which includes less than 20% by weight of a polar protic solvent.

7. The composition claimed in claim 7 wherein the polar protic solvent is water.

8. The composition claimed in claim 8 which includes less than 5% by weight of water.

9. The composition claimed in claim 2 wherein said complex is substantially unsolvated.

10. The composition claimed in claim 2, wherein the alkali metal ion is a potassium ion and the compound of said formula is a polyethylene glycol.

11. The composition claimed in claim 2, wherein the alkali metal ion is a potassium ion and the compound of said formula is diethylene glycol monomethyl ether.

* * * * *